(No Model.)

A. S. GEAR.
FLEXIBLE GEARING.

No. 252,028. Patented Jan. 10, 1882.

Witnesses:
A. Vance
M. Jones

Inventor:
Alonzo S. Gear

United States Patent Office.

ALONZO S. GEAR, OF NEW YORK, N. Y., ASSIGNOR TO THE PERPETUAL TENSION PROPELLING BELT COMPANY, OF SAME PLACE.

FLEXIBLE GEARING.

SPECIFICATION forming part of Letters Patent No. 252,028, dated January 10, 1882.

Application filed January 28, 1881. (No model.)

*To all whom it may concern:*

Be it known that I, ALONZO S. GEAR, of the city, county, and State of New York, have invented a new and useful mechanism—a Flexible Gear or Worm; and I do hereby declare that the following, taken in connection with the drawings which accompany and form part of this specification, is a description of my invention sufficient to enable those skilled in the art to practice it.

This invention relates to a new mechanism—a flexible gear or worm—the object being to be able to construct machines with gearing that may be run at high speed with less noise than is usual, to utilize a higher degree of the power expended, to obviate other difficulties in transmitting power, and for other purposes.

The invention consists of making flexible gears or worms of coiled wire that will mesh into or encircle and mesh into the teeth of gears of equal or unequal diameters, and the connecting of the same together for use in machines for various purposes.

Gears made in the usual manner similar to those known as "concaved" or "worm" gears may be used with this invention.

My coiled-wire flexible gear or worm I make of coiled wire coiled on any suitably-formed mandrel—round, square, or other shaped—or in any suitably-formed nut. The ends of the coiled wire, which is made of any desired length, are fastened together in any suitable manner, so that it will form an endless flexible gear or worm, which may be made purposely short, according to the diameter of the gear or gears it is to encircle and distance apart, so that when stretched around the same it will be sufficiently opened to act free and mesh into or between the teeth of the gears, or may be formed open when coiled, obviating the necessity of being stretched, and the ends of the same be fastened together when in position around said gears or otherwise.

For some purposes an end or the ends or other portion of my coiled-wire gear or worm may run in bearings made for itself, or journals may be connected to an end or the ends or other portion of the same and run in suitable boxes, and thus form a flexible gear or worm of great convenience and utility for many purposes.

Although my flexible gear or worm may be used for many purposes, I will describe it as applied to gears.

The accompanying drawings illustrate my invention, in which similar letters of reference refer to like parts.

Figure 1:
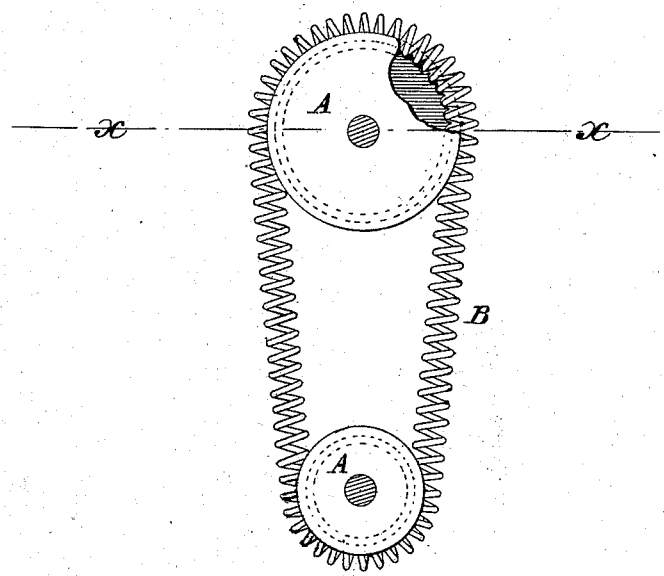
Figure 2:
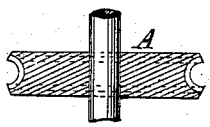
Figure 3:
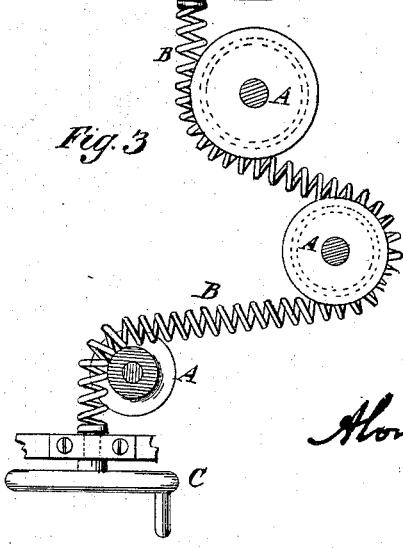

Figure 1 is a side view of gear-wheels provided with my flexible gear or worm. Fig. 2 is a cross-section through the line $x\,x$ of Fig. 1. Fig. 3 illustrates my flexible gear and worm arranged to run gears placed in various positions.

A represents the gears; B, the flexible gear or worm. While the gear or worm illustrated in Fig. 1 is shown to be endless, it is obvious that the ends or other part of the coil, before being fastened together, may be controlled in properly-fixed bearings, and thus form a worm, and made to revolve by turning it by a handle or pulley, C, or by the movement of the gear or gears meshing into it, one of which may be an idler-pulley, or vice versa, and, being flexible, may be used in straight or at almost any angle desired other than straight lines, or both, for many purposes, as illustrated in Fig. 3.

When my flexible gear or worm is made round and is used as an endless gear or as a worm it revolves at right angles with its forward motion, and by reason of said motion and its peculiar construction utilizes a higher degree of the power expended. It can be run more rapidly than ordinary gears, as a gear or worm, and with less noise.

I am aware that my flexible gear or worm may be used for belts, sash cords, &c., having been granted Letters Patent May 4, 1880, for it as a belt, &c., and having applied for a patent for it—said application being of even date herewith—for sash-cords, &c., I do not claim it in this application for those purposes.

I am also aware that Letters Patent were issued to T. Welham, No. 46,166, dated January 31, 1865, reissued July 21, 1874, for flexible shafts, and do not claim a flexible shaft.

What I do claim is—

The combination of an open helical coiled wire or flexible worm with suitable concave toothed gear-wheels, for the purpose of transmitting motion, as set forth.

ALONZO S. GEAR.

Witnesses:
JOHN R. MANLEY,
GEORGE P. AVERY.